US012679223B2

(12) United States Patent
Milacic

(10) Patent No.: US 12,679,223 B2
(45) Date of Patent: Jul. 14, 2026

(54) PRE-ENERGIZATION FOR POWER OPERATED DISCONNECT SYSTEMS

(71) Applicant: Magna Powertrain, Inc., Aurora (CA)

(72) Inventor: Dusan Milacic, North York (CA)

(73) Assignee: Magna Powertrain, Inc., Aurora (CA)

( * ) Notice: Subject to any disclaimer, the term of this patent is extended or adjusted under 35 U.S.C. 154(b) by 64 days.

(21) Appl. No.: 18/719,467

(22) PCT Filed: Dec. 15, 2022

(86) PCT No.: PCT/CA2022/051835
§ 371 (c)(1),
(2) Date: Jun. 13, 2024

(87) PCT Pub. No.: WO2023/115196
PCT Pub. Date: Jun. 29, 2023

(65) Prior Publication Data
US 2025/0058650 A1 Feb. 20, 2025

Related U.S. Application Data

(60) Provisional application No. 63/291,616, filed on Dec. 20, 2021.

(51) Int. Cl.
B60L 15/32 (2006.01)
B60R 16/023 (2006.01)

(52) U.S. Cl.
CPC .......... B60L 15/32 (2013.01); B60R 16/0231 (2013.01); B60L 2240/421 (2013.01);
(Continued)

(58) Field of Classification Search
CPC .. B60L 15/32; B60L 2260/26; B60L 2260/28; B60K 23/08; B60Y 2200/91
See application file for complete search history.

(56) References Cited

U.S. PATENT DOCUMENTS 4,620,261 A 10/1986 Thornton
6,123,183 A * 9/2000 Ito ......................... F16D 48/064
192/220
(Continued)

FOREIGN PATENT DOCUMENTS

DE 102019201945 A1 8/2020
DE 102020207169 A1 12/2021
(Continued)

OTHER PUBLICATIONS

Machine translation of KR20210153212A (Year: 2021).*
(Continued)

*Primary Examiner* — Scott A Browne
*Assistant Examiner* — Jisun Choi
(74) *Attorney, Agent, or Firm* — Dickinson Wright PLLC

(57) ABSTRACT

A method of controlling a secondary drivetrain of an electrically powered vehicle includes receiving a connect request for a disconnect mechanism, which includes a first and second clutch member. The second clutch member is biased to a disconnected state from the first clutch member and axially moveable into a connected state to transfer torque from an electric motor to the wheels. An initial current is applied to an actuator of the second clutch member, but the initial current does not overcome the bias on the second clutch member. The electric motor rotates the first clutch member such that a speed difference relative to the second clutch member is reduced below a threshold level. The method applies an additional current to the actuator, which overcomes the bias and connects the clutch members to transfer torque. The time to connect the clutch members is reduced because the initial current was already applied.

18 Claims, 5 Drawing Sheets

(52) U.S. Cl.
      CPC ... *B60L 2240/423* (2013.01); *B60L 2240/463*
            (2013.01); *B60L 2240/507* (2013.01); *B60L*
            *2260/26* (2013.01); *B60L 2260/28* (2013.01)

(56) References Cited

U.S. PATENT DOCUMENTS

| | | | |
|---|---|---|---|
| 6,766,788 B2 | 7/2004 | Xu | |
| 2003/0140898 A1* | 7/2003 | Xu | F02D 41/20 |
| | | | 361/152 |
| 2015/0142280 A1* | 5/2015 | Tamoto | B60W 30/19 |
| | | | 701/53 |
| 2015/0354643 A1* | 12/2015 | Ebuchi | F16D 48/064 |
| | | | 192/69 |
| 2016/0152238 A1* | 6/2016 | Mita | B60W 10/06 |
| | | | 180/197 |
| 2017/0182887 A1 | 6/2017 | Ogawa et al. | |
| 2020/0070655 A1* | 3/2020 | Yaguchi | B60K 17/346 |
| 2021/0010544 A1 | 1/2021 | Nagaoka | |
| 2023/0080481 A1* | 3/2023 | Arun | B60K 17/3515 |
| | | | 701/67 |

FOREIGN PATENT DOCUMENTS

| | | | |
|---|---|---|---|
| JP | 2010025279 A | 2/2010 | |
| JP | 2005168191 A | 6/2023 | |
| KR | 20210153212 A * | 12/2021 | B60L 15/20 |

OTHER PUBLICATIONS

Canadian Intellectual Property Office, Gatineau, Quebec, Canada, International Search Report of International Application No. PCT/CA2022/051835, Mailed Mar. 16, 2023, 3 pages.

* cited by examiner

FIG 5

PRE-ENERGIZATION FOR POWER OPERATED DISCONNECT SYSTEMS

CROSS-REFERENCE TO RELATED APPLICATIONS

The present application is a U.S. National Stage Application that claims the benefit of PCT International Patent Application PCT/CA2022/051835, filed Dec. 15, 2022, which claims the benefit of previously filed U.S. Provisional Patent Application No. 63/291,616, filed Dec. 20, 2021, the entire disclosures of which are hereby incorporated by reference in their entirety

FIELD

The present disclosure is generally related to the control of differential assemblies of the type used in motor electric motor vehicles which include a power-operated disconnect mechanism operable for selectively coupling and uncoupling a secondary electric machine from the ground-engaging wheels. The present disclosure is related to power-operated disconnect mechanisms which uncouple the secondary electric machine differential or geartrain from the ground-engaging wheels. The present disclosure is more specifically directed to a method of control to improve the response time of the power-operated disconnect mechanism and secondary electric machine to provide for a faster responding connecting mode.

BACKGROUND

This section provides background information related to the present disclosure which is not necessarily prior art.

In view of the recent commitment of most motor vehicle OEM's to develop electric vehicles (EV's), a great deal of engineering activity has been directed to providing an efficient driveline arrangement to provide improved tractive effort and dynamics. In many configurations, the electric powertrain is the exclusive or "primary" electric powertrain and is operable for generating and transmitting motive power (i.e., drive torque) to a single pair of wheels, typically the front wheels. However, attention has also been directed to development of EV's having a "secondary" electric powertrain, in addition to the primary electric powertrain, that is operable to generate and transmit motive power to the other pair of wheels, such as the rear wheels, to establish a four-wheel drive (4WD) vehicle. The secondary electric powertrain may include an electric motor driving a differential assembly, packaged as an electric drive axle. In some vehicle arrangements, a pair of secondary electric motors may be used, each powering an individual secondary wheel. When the 4WD mode is not required, it is known to selectively "disconnect" the secondary electric powertrain by uncoupling the ground-engaging wheels from the electric motor via a power-operated disconnect device to improve overall efficiency as rotation of components are reduced. Often times this disconnect mechanism is located at or near the differential assembly for providing the most improvement in parasitic drag loss.

As these disconnect systems are typically dog clutch based solutions to minimize parasitic drag losses while disconnected, the speeds of the rotating clutch members must be relatively similar before engagement can occur. Current systems utilize the electric motor to spin up the components in a disconnecting differential mechanism to reduce the difference in rotational speeds as close as possible to zero RPM. This requires a period of time to bring the motor and associated components up to speed. Existing control logic of disconnect systems then wait until the difference in rotational speeds is minimized before applying current to the power operated disconnect to ensure successful engagement. This sequential operating of matching clutch member speeds, then energizing the power operated disconnect and mechanically engaging the clutches takes a period of time. The time required can be detrimental to the operation and stability of a vehicle transitioning from 2WD to 4WD. Based on the amount of attention currently directed to development of optimized secondary electric powertrains and expectations that the vehicle can quickly adapt to a change in operating conditions, there is a need to reduce the response time of engaging the power operated disconnect mechanism in the secondary electric powertrain.

SUMMARY

This section provides a general summary of the many aspects associated with the inventive concepts embodied in the teachings of the present disclosure and is not intended to be considered a complete listing of its full scope of protection nor all of its features and advantages.

It is an aspect of the present disclosure to provide an improved control logic of an electric powertrain having a power operated mechanism which is configured for use in motor vehicle drivetrain and/or driveline applications to disconnect the secondary electric machine from the ground engaging wheels.

In accordance with this aspect, such a power operated disconnect mechanism of the present disclosure is generally associated with an electric powertrain and configured to be utilized in electrically-powered transaxle or drive axle of the type used in partially or fully electric vehicles for selectively transmitting motive power (i.e. drive torque) from an electric motor to a pair of ground-engaging wheels.

In an aspect to integrate a power operated disconnect mechanism with such an improved control logic to provide a faster responding system including a disconnect of the differential or components of the differential between the electric motor and to a pair of ground-engaging wheels.

The method of controlling a disconnectable differential assembly of the present disclosure is configured to be utilized in a system which generally includes a differential housing driven by the electric motor, a differential mechanism drivingly connected to the ground-engaging wheels, and a power-operated disconnect mechanism operable in a first or "Connected" mode to couple a differential mechanism and further operable in a second or "Disconnected" mode to uncouple the differential mechanism.

The power-operated disconnect mechanism associated with the control logic described is configured with a clutch unit having a first clutch member and a second clutch member. The second clutch member is axially moveable between a first or "retracted" position whereat dog teeth on the second clutch member are disengaged from clutch teeth on the first clutch member to establish the clutch unit's "released" state and a second or "extended" position whereat its dog teeth are drivingly engaged with the clutch teeth on the first clutch member to establish a clutch unit's "engaged" state. A biasing arrangement is provided for normally biasing the second clutch member toward its retracted or "disconnected" position. The electromagnetic actuator unit is nonrotatably mounted externally of the outer housing and includes an annular solenoid and a moveable actuation component, configured as a magnetic plunger. A clutch actuation mechanism interconnects the plunger to the second clutch member such that movement of the plunger between a first or "non-actuated" position and a second or "actuated" position results in corresponding movement of the second clutch member between its retracted and extended positions while facilitating rotation of the second clutch member relative to the plunger. Energization of the solenoid causes the plunger to move from its non-actuated position into its actuated position in opposition to the biasing exerted by the biasing arrangement. De-energization of the solenoid permits the biasing arrangement to forcibly return the plunger to its non-actuated position. A sensor may be utilized to determine position of the second clutch member.

It is an aspect of the present disclosure to partially energize the power operated disconnect mechanism during the same period of time that is utilized by rotation of the electric motor to bring components between the torque path from electric motor output to the first clutch member to a nearly identical rotational speed of the second clutch member, which is being driven by the ground-engaging wheels, to allow the first clutch member and second clutch member to engage.

It is an aspect of the present disclosure to provide current to the power-operated disconnect mechanism with a first current value which energizes the solenoid without movement of the plunger and a second increased current value, which creates movement of the plunger and therefore allows the second clutch member to engage into the first clutch member to reach a "connected mode" once the delta speeds between the first clutch and the second clutch are minimized.

It is an aspect of the present disclosure to reduce current to the power-operated disconnect mechanism below the value of the second current value to maintain the plunger in an engaged position and therefore the second clutch member continues to be engaged to the first clutch member in a "connected mode" to provide a reduced power mode.

In one aspect, a method of controlling a secondary drivetrain is provided, the method comprising the steps of: receiving a connect request from a control system to connect a disconnect mechanism of the secondary drivetrain, the disconnect mechanism operatively disposed between an electric motor and a ground engaging wheels of the secondary drivetrain; in response to receiving the connect request, increasing electric motor speed to reduce a speed difference between a first clutch member and second clutch member when the first and second clutch member are in a disconnected state; during the increasing of the electric motor speed, applying an initial level of pre-energization current to an electromagnetic actuator of the disconnect mechanism; during the increasing of the electric motor speed, detecting a decreasing speed difference between a first clutch member and second clutch member of the disconnect mechanism; confirming the speed difference between the first clutch member and second clutch member is below a threshold value; in response thereto, applying an second level of current that is higher than the initial current to the electromagnetic actuator and, in response thereto, providing movement of a plunger operatively coupled to the second clutch member in a direction toward the first clutch member and engaging the second clutch member with the first clutch member and reaching a connected state; in response to engaging the first and second clutch members, transferring torque between the electric motor and the ground-engaging wheels via the disconnect mechanism.

In another aspect, an electrically powered drivetrain of a vehicle is provided, wherein the electrically powered drivetrain comprises: an electric motor drivingly coupled to a differential mechanism having a disconnect mechanism including a first clutch member and a second clutch member moveable from a disconnected state into a connected state with the first clutch member; wherein, in the connected state, torque is transferred from the electric motor to ground engaging wheels of the drivetrain, and, in the disconnected state, torque is not transferred from the electric motor to the ground engaging wheels; wherein, in response to receiving a connect request from a control system of the vehicle, an actuator of the disconnect device applies an initial current to a plunger that applies a force on the second clutch member toward the first component, wherein the initial current is below a level great enough to overcome a bias on the second clutch member, and the second clutch member remains in the disconnected state during application of the initial current; wherein the first clutch member rotates independent of the second clutch member in the disconnected state; wherein actuation of the electric motor in response to the connect request reduces a speed difference between the first clutch member and the second clutch member; wherein the control system detects and confirms that the speed difference is below a threshold level, and the control system increases the current applied to the actuator to a second level that is higher than the initial current, wherein the second level of the current applies a force sufficient to overcome the bias on the second clutch member, and the second clutch member moves to the connected state and torque transfers from the electric motor to the ground engaging wheels via the differential mechanism.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 5 is a representation of the resultant series of events as defined by the disclosed control logic against time on a horizontal axis.

DETAILED DESCRIPTION

Example embodiments of the control logic of the power operated actuator of the present disclosure will now be more fully described with reference to the accompanying drawings. Drawings will include two alternative configurations of a disconnectable differential assemblies which can be utilized with such an innovative control logic. It should be appreciated other configurations integrating such a power operated actuator to provide disconnecting capability exist in the prior art and these two configurations are provided as merely examples. It is anticipated that those skilled in the art will fully comprehend all aspects, features and potential improvements associate with inventive concepts embodied in each.

Figure 1:
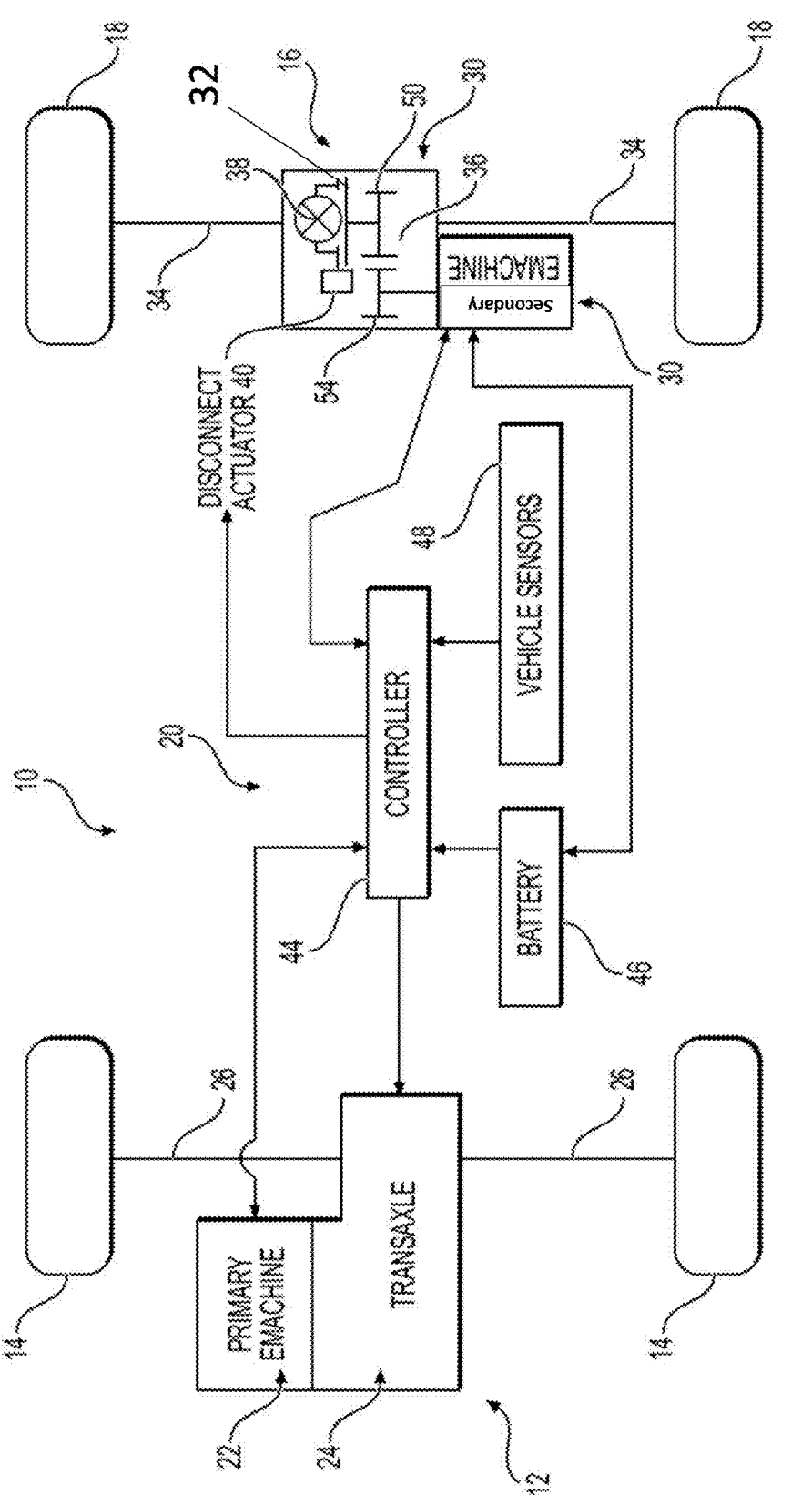
FIG. 1 is a diagrammatic illustration of a vehicle architecture for an exemplary electric vehicle (EV) equipped with a primary electrically-powered drivetrain for driving a set of primary (i.e. front) ground-engaging wheels, a secondary electrically powered drivetrain for selectively driving a set of secondary (i.e. rear) ground-engaging wheels, and a control system for controlling operation of both the primary and secondary drivetrains and power operated disconnect device.

With initial attention directed to FIG. 1, an exemplary vehicle architecture for an electric vehicle 10 is generally shown to include a primary (i.e. front) electrically powered drivetrain 12 configured to generate and transmit motive power (i.e., drive torque) to a pair of primary (i.e. front) ground-engaging wheels 14, a secondary (i.e. rear) electrically-powered drivetrain 16 configured to selectively generate and transmit drive torque to a pair of secondary (i.e. rear) ground-engaging wheels 18, and a control system 20 operable to control primary drivetrain 12 and secondary drivetrain 16. Primary drivetrain 12 is schematically shown to include a primary electric motor 22, a transaxle 24 driven by primary electric motor 22, and a pair of primary axleshafts 26 interconnecting primary wheels 14 to a primary differential assembly (not specifically shown) associated with transaxle 24. Drive torque generated by primary electric motor 22 can be multiplied via one or more gearsets within transaxle 24 and delivered to primary wheels 14 to define a two-wheel drive (2WD) mode of vehicle operation.

With continued attention to FIG. 1, secondary drivetrain 16 is schematically shown to include a secondary electric motor 30, a disconnectable differential assembly 32 selectively driven by secondary electric motor 30, and a pair of secondary axleshafts 34 interconnecting secondary wheels 18 to differential assembly 32. As will be described in greater detail in the first embodiment, disconnectable differential assembly 32 is generally configured to include a power transfer mechanism 36 driven by secondary electric motor 30, a differential mechanism 38 interconnecting secondary axleshafts 34, and a power-operated disconnect mechanism 40 operable for selectively coupling and uncoupling an output of power transfer mechanism 36 to an input of differential mechanism 38. Such an arrangement is considered a "center axle disconnect" and will be shown and described in the first embodiment of FIG. 2. Alternatively, as shown in the second embodiment of FIG. 3, power operated disconnect mechanism 40 could be positioned outboard of differential mechanism 38 between one of the secondary axle shafts 34 and the differential mechanism 38 to create a "side gear or shaft disconnect". For both configurations, when disconnect mechanism 40 is operating in a first or "Connected" mode, secondary electric motor 30 transmits drive torque to secondary wheels 18 which, in conjunction with the drive torque transmitted via primary electric motor 22 to primary wheels 14, defines a four-wheel drive (4WD) mode of vehicle operation. Control system 20 is shown schematically to generally include a controller 44 configured to control operation of primary motor 22, secondary motor 30, and power-operated disconnect mechanism 40 in response to a plethora of vehicle inputs (indicated by vehicle sensors 48), and powered by an electric power source (indicated by battery 46).

Figure 2:
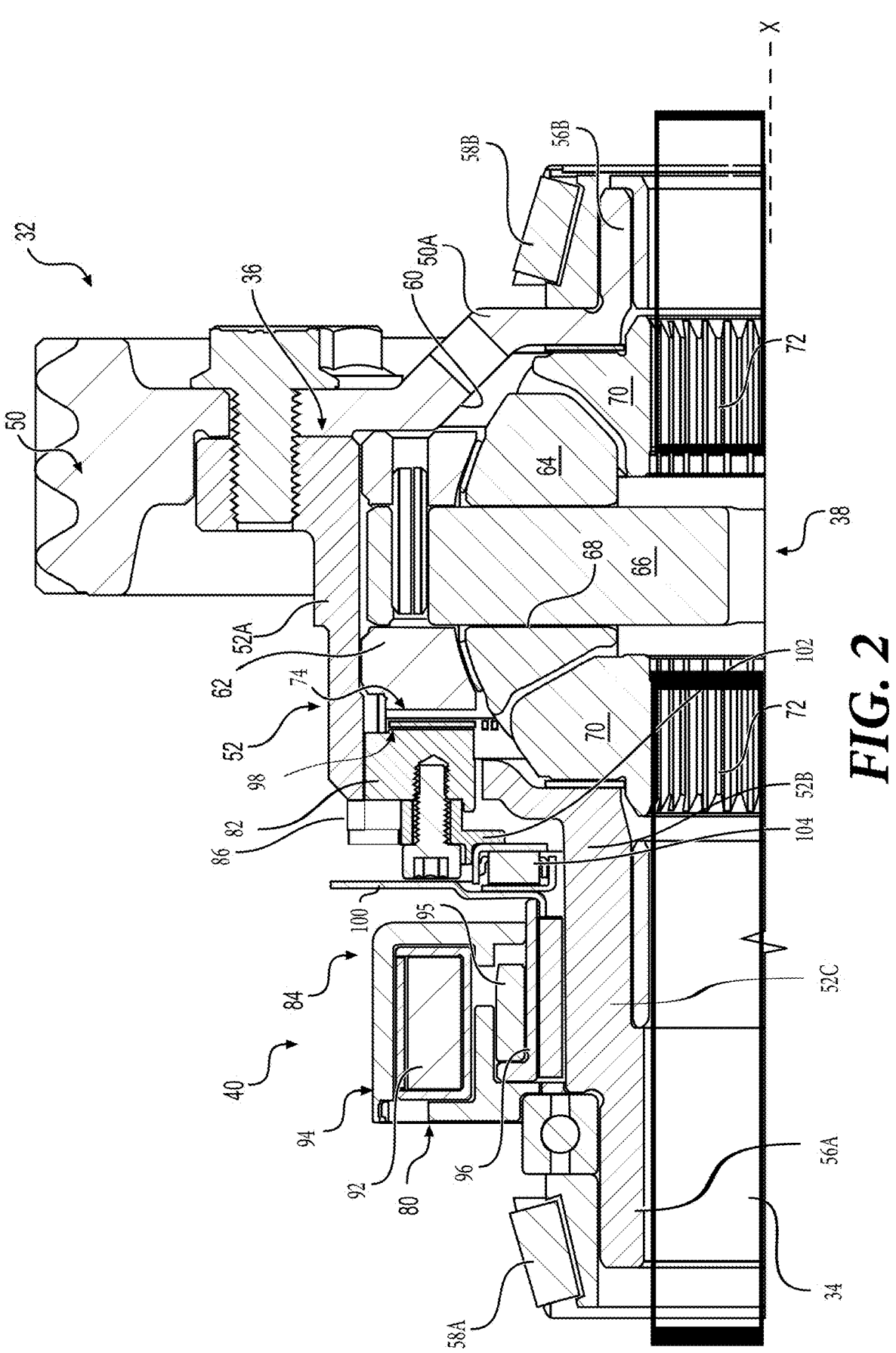
FIG. 2 is a partial sectional view of a center disconnectable differential assembly associated with the secondary electrically-powered drivetrain shown in FIG. 1 and generally configured to include a power transfer mechanism, a differential mechanism, and a power-operated disconnect mechanism.

With particular reference now to FIG. 2, a first non-limiting embodiment of a disconnect differential assembly 32 will be described. Power transfer mechanism 36 is generally shown to include a ring gear 50 and a bell-shaped outer housing 52 fixed to ring gear 50 for rotation about a common axis "X". Ring gear 50 is adapted to be driven by an output gear 54 (FIG. 1) of secondary electric motor 30. Ring gear 50 and outer housing 52 define a pair of laterally-spaced cylindrical bosses 56A, 56B upon which disconnect differential assembly 32 is rotatably supported in a housing (not shown) via a pair of laterally-spared bearing assemblies 58A, 58B. An axial hub section 52A and a radial ring section 52B of outer housing 52 cooperate with a plate portion 50A of ring gear 50 to define an internal cavity 60 within which differential mechanism 38 is supported for rotation about the "X" axis.

Differential mechanism 38 is shown to include a differential carrier 62, a pair of differential pinions 64 rotatably mounted on a pinion post 66 having its opposite ends secured in polar apertures 68 formed in differential carrier 62, and an pair of differential side gears 70 each meshed with both differential pinions 64. As is otherwise conventional, each differential side gear 70 has internal splines 72 configured to mesh with external splines formed on secondary axleshafts 34, whereby the output of differential mechanism 38 is drivingly connected to secondary wheels 18. Differential mechanism 38 is rotatably supported within internal cavity 60 of power transfer mechanism 36. A plurality axially-extending clutch teeth 74 are formed on an end surface of differential carrier 62 so as to define a first clutch member, configured as a face clutch.

Continuing to reference FIG. 2, power-operated disconnect mechanism 40 is shown to generally include an electromagnetic actuator unit 80, a clutch ring 82 (second clutch member), a clutch actuation unit 84 and a biasing arrangement 86. Electromagnetic actuator unit 80 is annular in configuration and is oriented to surround an intermediate boss segment 52C of outer housing 52. Electromagnetic actuator unit 80 is non-rotatably supported on intermediate boss segment 52A via a bearing 90 and a housing 91. Electromagnetic actuator unit 80 includes a solenoid 92, a clam-shell pole or core housing 94 encasing and surrounding solenoid 92, magnetic armature 95, and a non-magnetic plunger 96 supported by outer diametrical fits to core housing 94 allowing an axially-sliding movement relative to core housing 94. Clutch ring 82 is configured to rotate with outer housing 52 of power transfer mechanism 36 and move axially with clutch actuation unit 84. In addition to axial teeth 74 on differential carrier 62, clutch ring 82 also includes a second set of axial teeth 98 facing towards axial teeth 74 for engagement when clutch ring 82 is moved axially. Thus, clutch ring 82 can be controlled to rotate at a desired speed and axially actuated into engagement with the teeth 74 of differential carrier 62 when the desired speed is comparable to the speed of the differential carrier 62 that is rotating with the axleshafts 34.

Clutch actuation unit 84 generally includes a first actuation plate 100, a second actuation plate 102 and a thrust bearing 104. First actuation plate 100 engages plunger 96, second actuation plate 102 engages and mounts to clutch ring 82. Thrust bearing 104 is disposed between first actuation plate 100 and second actuation plate 102. As first actuation plate 100 is non-rotatable, thrust bearing 104 accommodates relative rotation between first actuation plate 100 and second actuation plate 102. Put another way, clutch ring 82 can rotate with housing 52 while first actuation plate 100, core housing 94, and solenoid 92 do not. Biasing arrangement 86 is positioned between second actuation plate 102 and outer housing 52 and is biased to push clutch ring 82 away from differential carrier 62 when disconnect actuator 40 is powered off. Biasing arrangement 86 may be any type of spring, such as a wave or coil spring, which provides acceptable opposing force within the appropriate package.

In accordance with a preferred operational configuration, disconnect differential assembly 32 is normally operable in a Disconnected mode when electromagnetic actuator unit 80 is operating in a "power-off" condition and can be shifted into a Connected mode in response to electromagnetic actuator unit 80 being placed in a "power-on" condition. More specifically, clutch ring 82 is operating in a "released" state when the Disconnected mode is established and is operating in an "engaged" state when the Connected mode is established. The released state of clutch ring 82 is established when biasing arrangement 86 locates clutch ring 82 in a retracted position, whereat its axial teeth 98 are displaced from engagement with axial teeth 74 of differential carrier 62. Such biased axial movement of clutch ring 82 to its retracted position causes plunger 96 to be forcibly moved axially to a non-actuated position (shown in FIG. 2) relative to solenoid 92 due to the interconnection established therebetween via clutch actuation unit 84. With clutch ring 82 located in its retracted position, differential carrier 62 is not drivingly connected with outer housing 52, whereby differential mechanism 38 is uncoupled from power transfer mechanism 36. As such, no drive torque is transmitted from secondary electric motor 30 through disconnectable differential assembly 32 to second wheels 18.

When it is desired to move to a "connected" mode and transmit torque from secondary electric motor 30 to secondary wheels 18, rotational speeds between axial teeth 98 of clutch ring 82 and axial teeth 74 of differential carrier 62 must be rotating in the same direction with minimal (<50 RPM) speed difference prior to engagement. In this regard, minimal refers to a reduced speed difference, or a speed difference below a threshold level. In one aspect, the speed difference must be below 50 RPM, but other threshold speed differences may also be determined based on various design parameters.

In order to reduce the differential speed difference, controller 44 provides a signal 110 (FIG. 4) to request "connected" mode resulting in secondary electric machine 30 to be commanded to a speed equivalent to the vehicle 10 speed, taking in consideration of ratios in secondary drivetrain 16. As will be further described later, this command signal 110 also begins to partially energize solenoid 92 pre-charging electromagnetic actuator 80. Once the speed difference is determined to be within acceptable range, disconnect differential assembly 32 is shifted into its fully Connected mode by switching electromagnetic actuator unit 80 into its full power-on condition for energizing solenoid 92. The magnetic circuit generated upon full power-on energization of solenoid 92 causes magnetic plunger 96 to overcome the opposing force of biasing arrangement 86 to move plunger 96 axially from its non-actuated position into an actuated position which, in turn, causes clutch ring 82 to move from its retracted position into an extended position, whereat its axial teeth 98 engage with axial teeth 74 on differential carrier 62. Such movement of plunger 96 to its actuated position and clutch ring 82 to its extended position, due to energization of solenoid 92, is in opposition to the force exerted by biasing arrangement 86. With clutch ring 82 located and held in its extended position, differential carrier 62 is drivingly connected to outer housing 52, whereby differential mechanism 38 is coupled to power transfer mechanism 36 and therefore rotates in accordance with the controlled rotation of outer housing 52 by ring gear 50 (which is driven by secondary electric motor 30 via output gear 54). As such, drive torque generated by secondary electric motor 30 is transmitted from disconnectable differential assembly 32 to secondary wheels 18 to establish the 4WD mode. Additionally, regeneration of the power supply can be controlled via shifting disconnect differential assembly 32 into its Connected mode when secondary electric motor 30 is not transmitting torque via a regeneration control associated with control system 20.

Figure 3:
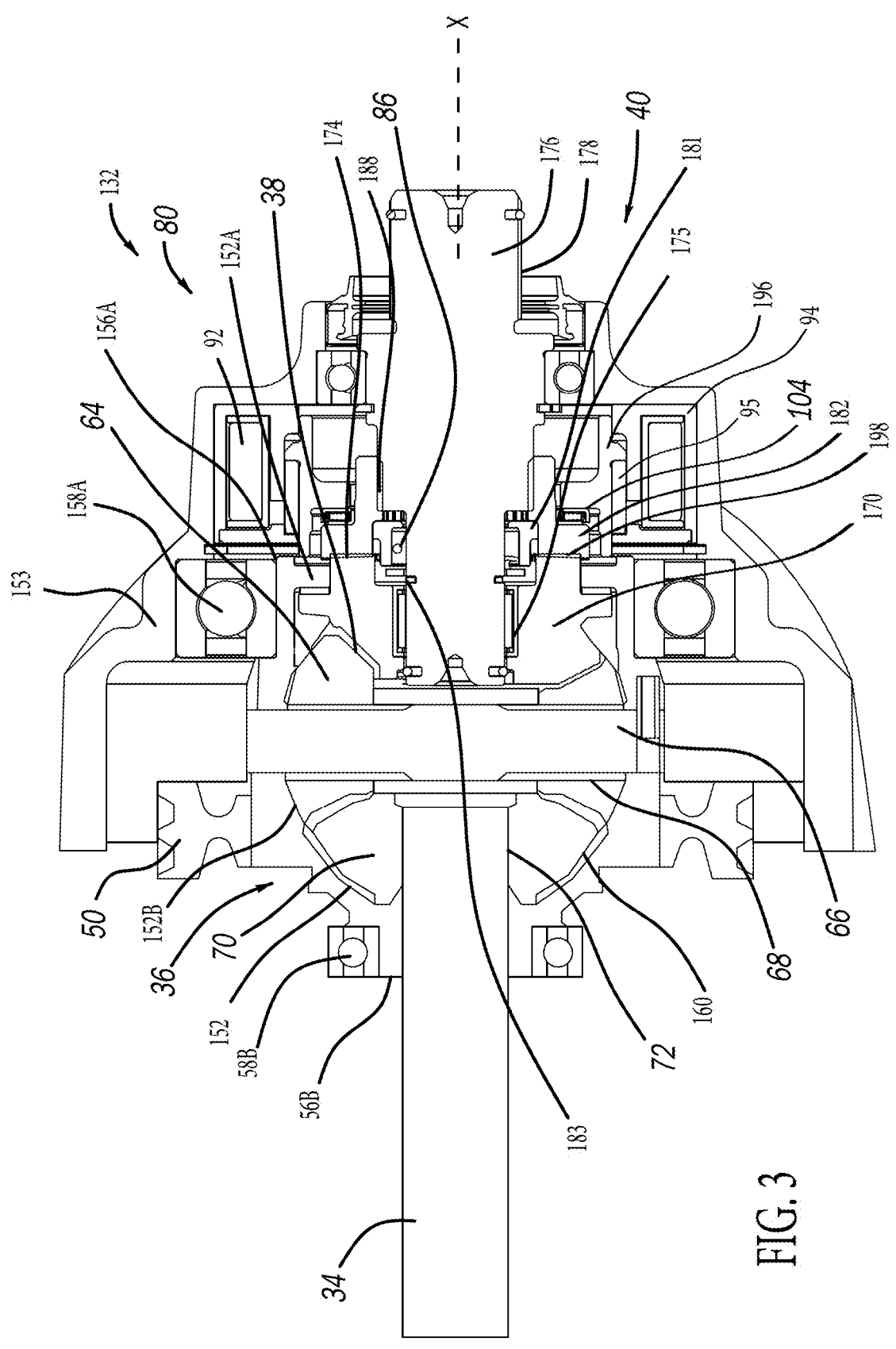
FIG. 3 is a sectional view of a side gear disconnectable differential assembly associated with the secondary electrically-powered drivetrain shown in FIG. 1 and generally configured to include a power transfer mechanism, a differential mechanism, and a power-operated disconnect mechanism.

With particular reference now to FIG. 3, a second non-limiting embodiment of a disconnect differential assembly 132 will be described. Since many of the components shown in association with disconnect differential assembly 132 are generally similar, in terms of both structure and function to those previously described for disconnect differential assembly 32, common reference numerals are used and further explanation thereof is not required. In particular, disconnect differential assembly 132 is configured to provide a similar disconnect actuator 40, but now with the disconnect location adjacent to differential mechanism 38 and providing a connection or disconnection between one of the secondary axleshafts 34 and a side gear 70 modified to include axially extending clutch teeth which will be further described.

Power transfer mechanism 36 is generally shown again to include a ring gear 50 and a bell-shaped differential housing 152 fixed to ring gear 50 for rotation about a common axis. Ring gear 50 is adapted to be driven by an output gear 54 (FIG. 1) of secondary electric motor 30. Differential housing 152 provides a surface 156A at a large diameter of axial hub section 152A and a cylindrical boss 56B at a smaller diameter upon which disconnect differential assembly 132 is rotatably supported in a housing 153 (partially shown) via a pair of bearing assemblies 158A and 58B. The axial hub section 152A and a radial ring section 152B of outer housing 152 cooperate to define an internal cavity 160 within which differential mechanism 38 is supported for rotation about the common axis.

Differential mechanism 38 is shown to include a pair of differential pinions 64 rotatably mounted on a pinion post 66 having its opposite ends secured in apertures in housing 152. The differential side gears 70, 170 are each meshed with both differential pinions 64, but one differential side gear 70 is like the side gear of the first embodiment shown in FIG. 1, and the opposite differential side gear 170 now is modified to include axial clutch teeth 174 on the face opposite from pinion post 66. Differential side gear 70 utilizes splines 72 to transmit torque to secondary axleshafts 34, while differential side gear 170 is supported to allow rotation by bearing 175 which allows free rotation relative to output shaft 176. Output shaft 176 is fixed in rotation to secondary axleshaft (not explicitly shown in FIG. 3) via spline feature 178 to transmit torque to one secondary wheel 18 and is supported by a bearing to housing 153. This results in the output of differential mechanism 38 to be only drivingly connected to both secondary wheels 18 when disconnect differential assembly 132 is in the "connected" mode. When disconnected, opposite axleshafts 34 rotate freely relative to each other and relative to outer housing 152. Differential mechanism 38 is rotatably supported within generally spherical shaped internal cavity 160 of power transfer mechanism 36. A plurality of axially-extending clutch teeth 174 are formed on an end surface of differential side gear 170 so as to define a first clutch member, configured as a face clutch.

Continuing to reference FIG. 3, power-operated disconnect mechanism 40 is shown to generally include a similar electromagnetic actuator unit 80 and a clutch hub 182 (second clutch member) with a simplified arrangement allowing direct clutch actuation of plunger 196 thru thrust bearing 104 to clutch hub 182. Thrust bearing 104 accommodates relative rotation between plunger 196 and clutch hub 182. A retainer 181 is used to locate biasing arrangement 86 in a space radially inwards from clutch hub 182. Retainer 181 is fixed axially and rotationally to clutch hub 182 so they move concurrently. Biasing arrangement 86 is now positioned between retainer 181 and a shoulder ring 183 fixed to output shaft 176 to return clutch unit 182 away and out of engagement from side gear 170 when disconnect actuator 40 is powered off. Electromagnetic actuator unit 80 is annular in configuration and is oriented to surround output shaft 176 and clutch unit 182. Electromagnetic actuator unit 80 is non-rotatably supported in housing 153. Thus, clutch hub 182 may rotate relative to actuator unit 80 via thrust bearing 104. Electromagnetic actuator unit 80 continues to include a solenoid 92, a clam-shell pole or core housing 94 encasing and surrounding solenoid 92, magnetic armature 95, and a non-magnetic plunger 196. Thrust bearing 104 is disposed axially between a radial flange of plunger 196 and a radial flange of clutch unit 182. Magnetic armature 95 is supported by outer diametrical fits to core housing 94 allowing an axially-sliding movement. Clutch unit 182 is configured to rotate with output shaft 176 via spline 188 and to move axially with movement of plunger 196 when solenoid 92 is energized. In addition to axial teeth 174 on differential side gear 170, clutch hub 182 also includes a second set of axial teeth 198 facing axial teeth 174.

In accordance with a preferred operational configuration, disconnect differential assembly 132 is normally operable in a Disconnected mode when electromagnetic actuator unit 80 is operating in a "power-off" condition and is shifted into a Connected mode in response to electromagnetic actuator unit 80 being placed in a "power-on" condition. More specifically, clutch unit 182 is operating in a "released" state when the Disconnected mode is established and is operating in an "engaged" state when the Connected mode is established. The released state of clutch unit 182 (shown in FIG. 3) is established when biasing arrangement 86 locates clutch unit 182 in a retracted position, whereat its axial teeth 198 are displaced from engagement with axial teeth 174 of side gear 170. Such axial movement of clutch unit 182 to its retracted position causes plunger 96 to be forcibly moved axially to a non-actuated position relative to solenoid 92 due to the interconnection established therebetween by thrust bearing 104. With clutch unit 182 located in its retracted position, side gear 170 is not drivingly connected to output shaft 176 resulting in an unbalanced torque condition of differential mechanism 38. When disconnected, one axleshaft 34 and the side gears 70, 170 will rotate independent of the opposite axleshaft 34. Although differential mechanism 38 is coupled to power transfer mechanism 36, no drive torque is transmitted from secondary electric motor 30 through disconnectable differential assembly 132 to second wheels 18. Also, within the differential mechanism 38 when in a disconnected mode, side gear 70 will rotate with secondary axleshaft 34 as a torque transmitting spline connection 72 is maintained. Side gear 170 is not coupled to output shaft 176, and it will be driven by differential pinion gears 64 in an opposite rotating direction. As output shaft 176 is connected to one side of the secondary axleshaft 34, axial teeth 174 of side gear 170 and axial teeth 198 of clutch hub 182 will see a relative speed that is twice the ground-engaging wheel speed.

When it is desired to transmit torque from secondary electric motor 30 to secondary wheels 18, signal 110 sets in motion a similar sequence of events as described previously. Controller 44 commands secondary motor 30 to match rotating speeds between side gear 170 and clutch hub 182 by spinning up secondary motor 30 to match the speed of electric vehicle 10 considering ratios within secondary drivetrain 16, while at the same time electromagnetic actuation 80 applies a pre-energization current to solenoid 92. Once the speed difference is determined to be within acceptable range between side gear 170 and clutch hub 182, disconnect differential assembly 132 is shifted into its fully Connected mode by shifting electromagnetic actuator unit 80 into its full power-on condition for energizing solenoid 92. The magnetic circuit generated upon full power on energization of solenoid 92 causes magnetic plunger 196 to overcome the opposing force of biasing arrangement 86 to move axially from its non-actuated position into an actuated position which, in turn, causes clutch hub 182 to move from its retracted position into an extended position, whereat its axial teeth 198 engage with axial teeth 174 on side gear 170. Such movement of plunger 196 to its actuated position and clutch hub 182 to its extended position, due to energization of solenoid 92, is in opposition to the force exerted by biasing arrangement 86. With clutch hub 182 located and held in its extended position, side gear 170 is drivingly connected to output shaft 176, whereby differential mechanism 38 is coupled to power transfer mechanism 36. As such, drive torque generated by secondary electric motor 30 is transmitted from disconnectable differential assembly 132 to secondary wheels 18 to establish the 4WD mode. Additionally, regeneration of the power supply can be controlled via shifting disconnect differential assembly 132 into its Connected mode when secondary electric motor 30 is not transmitting torque via a regeneration control associated with control system 20.

Figure 4:
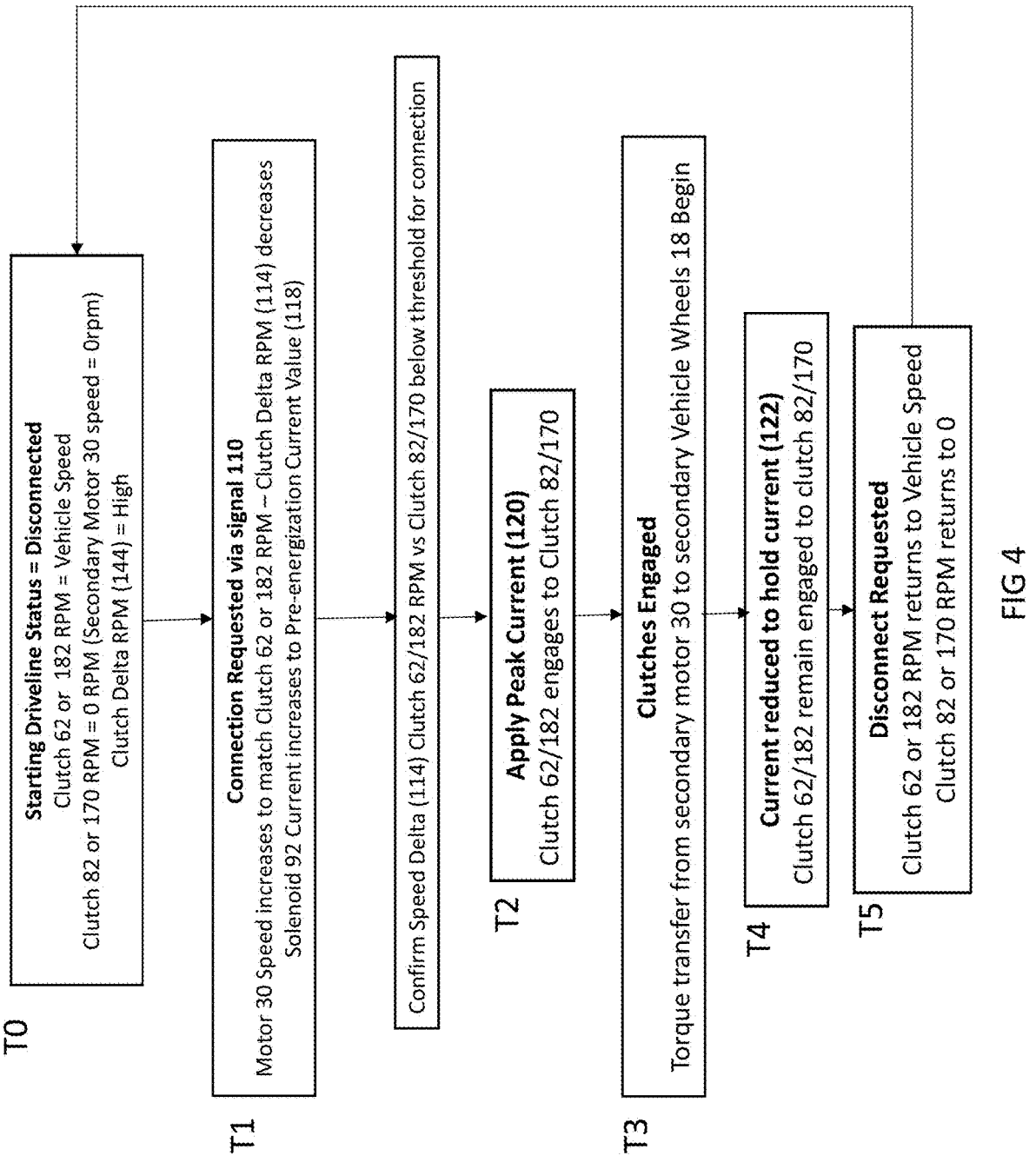
FIG. 4 is a flow chart of the method of control to improve the response time of the power-operated disconnect mechanism to provide for a faster responding connecting mode.
Figure 5:
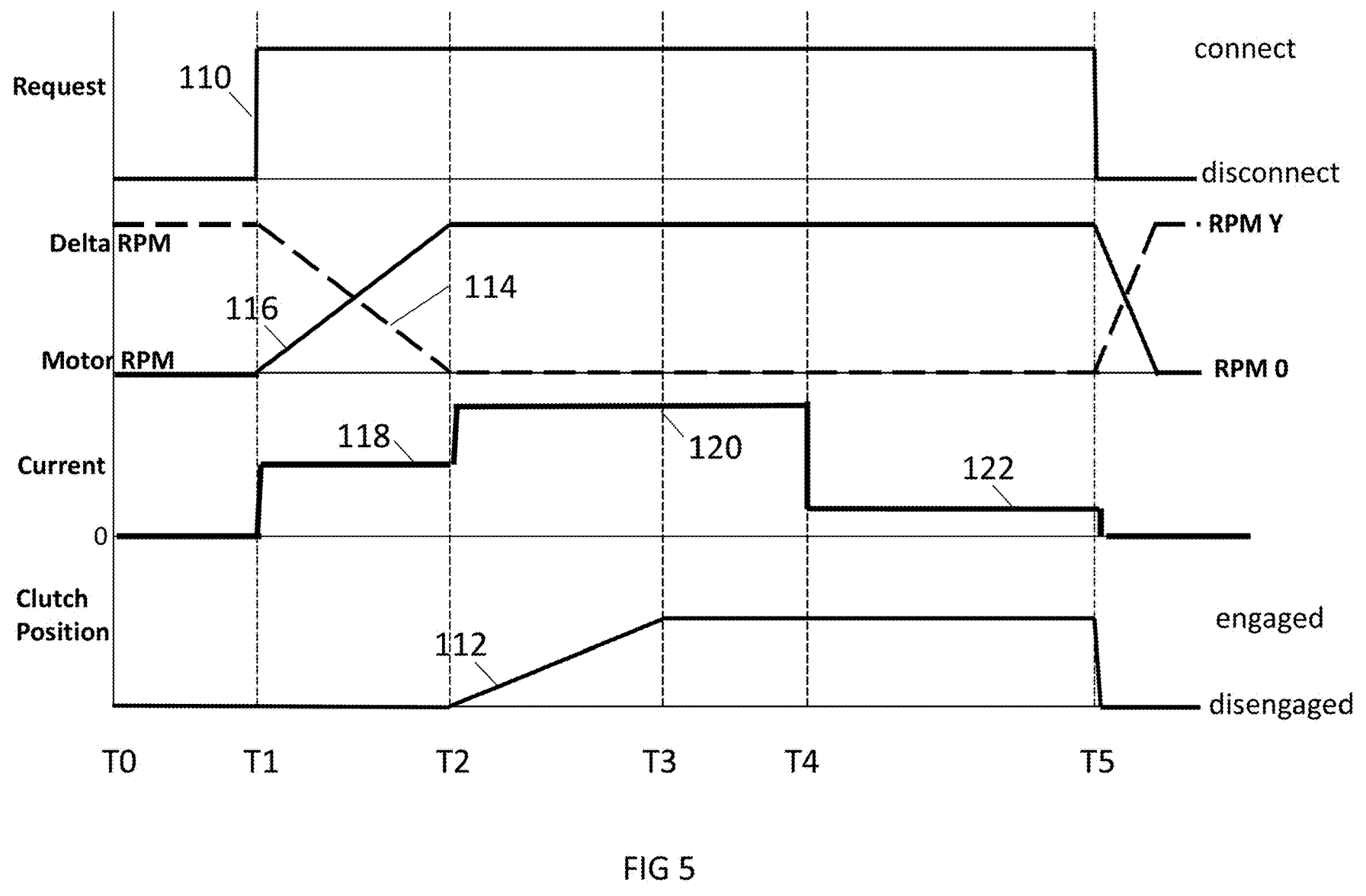

Now turning attention to FIG. 4 and FIG. 5, the figures will be described together as FIG. 4 represents a flowchart of the method of control of the power-operated disconnect mechanism, and FIG. 5 shows resultant actions of the secondary drivetrain 16 including secondary motor 30 and power operated disconnect 40 against a timeline. The use of the control method as described should not be considered as limited to just the embodiments described in detail for disconnectable differential assemblies 32 and 132. In an application where an electric motor drives individual wheels, the power transfer mechanism and differential mechanisms which have been fully described could become simplified. For instance, the power operated disconnect could be applied to a dog clutch positioned between concentric shafts, engaging and disengaging an input from the output.

It is a goal of this revised control logic to reduce the overall time duration from a point T1, when control system 20 provides a connection request signal 110, to point T3 when clutch teeth 74/174 and 98/198 are fully engaged and power can be transmitted from secondary electric motor 30 through secondary drivetrain 16 and to a pair of secondary (i.e. rear) ground-engaging wheels 18. This is achieved in the manner described below.

It is assumed the starting point of the method described operating in controller 44 is T0 (Time Zero), when vehicle 10 is in a 2WD mode and disconnect differential assembly 32 or 132 are in the disconnected mode according to request signal 110 being at the disconnect level in FIG. 5. Therefore, the secondary motor 30 rotational speed (116 of FIG. 5) is 0 RPM, but vehicle 10 is moving resulting in secondary wheels 18 and secondary axle shafts 34 to be rotating at ground speed. This results in a difference in speed across the clutches of the power operated disconnect 40. For instance, in the first embodiment clutch ring 82 will be stationary, while differential carrier 62 will be rotating. For the second embodiment side gear 170 will be rotating at the same speed as clutch hub 182 but in an opposite direction. These differences in rotating speed are defined as delta speed 114 and can be seen graphically in FIG. 5 where at T0, delta speed 114 is at Y RPM while motor speed 116 is at 0 RPM. Also note that at T0, the solenoid 92 of power operated disconnect 40 is not energized as current is zero. Also, clutch position 112 is in a disengaged status indicating biasing arrangement 86 is applying force and fully extended to separate clutch teeth 74/174 and 98/198 away from each other.

At T1, request 110 changes from "disconnect" to "connect" based on the request of control system 20 to move to a 4WD operating mode. This change in request 110 triggers at the same time T1 for RPM 116 of secondary electric motor 30 to speed up in order to synchronize components of differential assembly 32 or 132 and reduce delta RPM 114 to a reduced value below a threshold (i.e 50 RPM or lower) at the clutching interface. The delta RPM 114 value can be confirmed by the use of speed sensors positioned at various components, such as the ring gear 50 and secondary axle shafts 34. Also at time T1, a pre-energization current 118 is applied to solenoid 92. This current level is chosen to result in solenoid 92 to generate a level of magnetism to begin developing a force from magnetic armature 95 onto plunger 96, across thrust bearing 104 and into biasing arrangement 86. Pulse width modulation (PWM) will be used to control the level of current supplied. PWM adjusts the DC supply voltage in a manner to where DC supply power is switched on and off at a given frequency for a modulated period of time to create a duty cycle. Therefore, the time averaged voltage is only a portion of the maximum supply voltage and the current to the solenoid is also only a similar portion of maximum current. The level of magnetism will result in counteracting a small portion of the opposing force from biasing arrangement 86, but not enough force to compress biasing arrangement 86 to allow movement of the clutch actuation unit 84. By applying this partial or reduced current 118 at time T1, it reduces the overall time required to fully energize solenoid 92 and can be combined with the synchronization action of the secondary motor 30 to reduce total shift time between times T1 and T3.

As shown in FIG. 5, as time progresses from T1 to T2, motor RPM 116 has an increasing slope from 0 to Y, and delta RPM 114 has a decreasing slope from Y to 0. T2 occurs when delta RPM 114 reaches 0 (or below a threshold level). It will be appreciated that the illustrated slopes are schematic in nature and that the actual slopes may vary between T1 and T2. Delta RPM 114, of course, is dependent on the actual vehicle speed and wheel rotational speed occurring from ground engagement.

At T2, secondary electric motor 30 has met the speed target to reduce delta RPM 114 to a level close to 0 or below an allowable threshold. Therefore, as an example, differential carrier 62 and clutch ring 82 of disconnect differential assembly 32 will be matched in rotating speeds. Current supplied to solenoid 92 is increased from intermediate level 118 to a peak value 120, thereby increasing magnetic force on plunger 95 beyond the intermediate force, resulting in plunger 96 overcoming the opposing forces from biasing arrangement 86 as well as any associated static drag of components due to the initial axial movement and allowing the components of clutch actuation unit 84 to move, forcing clutch teeth 98 to engage into clutch teeth 74. Clutch ring 82 movement can be seen in the slope of clutch position 112 shown in FIG. 5, moving from a disengaged position toward an engaged position. Optionally, a position sensor could also be used to monitor and confirm such movement if desired by reading the position of second actuation plate 102. A similar series of events will occur in disconnect differential assembly 132. If a pre-energization current 118 was not applied until T2 (the time where delta RPM 116 is below the threshold), the overall time duration of connecting the secondary drivetrain 16 would be longer and could negatively influence the stability of vehicle 10 when transitioning to 4WD mode. For example, without the pre-energization, the period of time from a request to engage the clutch would be similar to the time from T1 to T3, rather than from T2 to T3 of the present disclosure. Full current cannot simply be applied instantly at the time of requesting 4WD, because doing so would cause clutch engagement prior to delta RPM being below the threshold level.

Now that clutches 62/182 or 82/170 are fully engaged, power is supplied by secondary electric motor 30 to secondary vehicle wheels 18 through the power transfer mechanism 36 and differential 38. Current to solenoid 92 continues to remain at a peak level 120 for a period of time from T3 to T4, but at T4 current to solenoid 92 can be reduced to a hold current 122. At this hold current 122, solenoid 92 will provide a reduced level of force thru clutch actuation unit 84 but it will be a force that is still higher than biasing arrangement 86 can overcome to separate clutches 62/182 or 82/170. This maintained clutch engagement at a reduced current provides an efficient power operated disconnect, as there is no need to maintain peak current 120 for all periods while disconnecting differential 32 is connected. As shown in FIG. 5, hold current 122 is lower than intermediate initial current 118, but it will be appreciated that these currents could be same, or hold current 122 may be higher than initial current 118 but still below peak level current 120.

At T5, controlling mechanism 20 requests a return to 2WD from 4WD mode with request signal 110 commanding and switching to the disconnected mode. Current within solenoid 92 reduces to zero resulting in the reducing of the magnetic field and reducing the force provided by armature 95 and plunger 96 thru clutch actuation unit 84 to zero. Biasing element 86 accordingly pushes clutch ring 82 away from differential carrier 62 and disengages clutch teeth 98 from clutch teeth 74 in the first embodiment of disconnecting differential 32. A similar disconnection of clutch hub 182 away from side gear 170 would occur in the disconnecting differential 132. Therefore, clutch position 112 returns to a fully disengaged position. Once fully disconnected, delta RPM 114 increases back to Y RPM as motor RPM 116 decreases to zero. The state of the secondary electric drivetrain 16 would return to the status as described originally at T0 and vehicle 10 would be again in 2WD mode. The above process can be repeated as necessary to shift between 2WD and 4WD modes.

The above described pre-energization process has been described with respect to the two clutch arrangements described herein, but it will be appreciated that such pre-energization can be performed on other clutch arrangements to switch from 2WD to 4WD at a secondary axle and can provide similar benefits of improved response time without premature engagement of the clutch when delta RPM is undesirably high and not reduced below a threshold level.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A method of controlling a secondary drivetrain, the method comprising the steps of:

receiving a connect request from a control system to connect a disconnect mechanism of the secondary drivetrain, the disconnect mechanism operatively disposed between an electric motor and ground engaging wheels of the secondary drivetrain;

in response to receiving the connect request, increasing electric motor speed to reduce a speed difference between a first clutch member and a second clutch member of the disconnect mechanism when the first and second clutch members are in a disconnected state;

during the increasing of the electric motor speed, applying a current, at an initial level of the current for pre-energization, to an electromagnetic actuator of the disconnect mechanism;

during the increasing of the electric motor speed, detecting a decreasing speed difference between the first clutch member and the second clutch member of the disconnect mechanism;

confirming the speed difference between the first clutch member and second clutch member is below a threshold level;

in response thereto, applying the current, at a second level of the current that is higher than the initial level of the current, to the electromagnetic actuator and, in response thereto, providing movement of a plunger operatively coupled to the second clutch member in a direction toward the first clutch member and engaging the second clutch member with the first clutch member and reaching a connected state;

in response to engaging the first and second clutch members, transferring torque between the electric motor and the ground-engaging wheels via the disconnect mechanism;

wherein a biasing mechanism is disposed operatively between the plunger and the first clutch member, wherein the biasing mechanism exerts a biasing force and biases the second clutch member away from the first clutch member toward the disconnected state;

wherein the initial level of the current causes the plunger to exert a force against the biasing member, wherein the biasing force is greater than the force exerted by the plunger against the biasing member, wherein the plunger remains stationary during provision of the initial level of the current.

2. The method of claim 1, wherein the initial level of the current is greater than zero and maintains a stationary position of the plunger.

3. The method of claim 1, wherein the second level of the current causes the force exerted by the plunger to exceed the biasing force, wherein the plunger causes movement of the second clutch member into the connected state.

4. The method of claim 1, wherein, after applying the second level of the current for a period of time to transfer torque to the wheels, the method includes reducing the current below the second level of the current and maintaining the current at a reduced level and holding the first and second clutch member in the connected state.

5. The method of claim 4, wherein, after reducing the current and holding the first and second clutch member in the connected state, receiving a disconnect signal and reducing the current to zero and moving the second clutch member away from the first clutch member and into the disconnected state.

6. The method of claim 1, wherein the first clutch member is a differential carrier of a differential of a power transfer mechanism, the differential carrier having axially extending teeth, and the second clutch member is a clutch ring rotationally coupled to an outer housing of the power transfer mechanism that is drivingly coupled to the electric motor.

7. The method of claim 6, wherein movement of the second clutch member into the connected state drivingly couples the ground engaging wheels to the outer housing and the electric motor for transferring torque therebetween.

8. The method of claim 1, wherein a first ground engaging wheel is coupled to a first side gear of a differential of a power transfer mechanism and a second ground engaging wheel is coupled to a second side gear of the differential, where the first clutch member is the second side gear, the second side gear having axially extending teeth, and the second clutch member is a clutch hub rotationally coupled to an output shaft connected to the second ground engaging wheel.

9. The method of claim 8, wherein movement of the second clutch member into the connected state drivingly couples the second ground engaging wheel to the second side gear and the differential via the output shaft, and the first ground engaging wheel is drivingly coupled to the first side gear and the differential, wherein torque from the power transfer mechanism is transferred to both ground engaging wheels via the differential.

10. The method of claim 8, wherein the wheel speed of the first ground engaging wheel is transmitted from the first side gear to the second side gear via the differential when in the disconnected state, wherein the second side gear rotates in an opposite direction relative to the second ground engaging wheel prior to actuation of the electric motor, wherein the actuation of the electric motor actuates a differential housing coupled to the side gears to reduce the speed difference between the second side gear and the first ground engaging wheel.

11. The method of claim 8, wherein the clutch hub rotates with the output shaft and the second ground engaging wheel, wherein the clutch hub is rotationally moveable relative to the plunger and axially moveable by the plunger.

12. The method of claim 6, wherein the carrier rotates in the same direction as the ground engaging wheels and relative to the clutch ring and the outer housing when in the disconnected state, wherein actuation of the electric motor adjusts the speed of the outer housing and the clutch ring toward the speed of the carrier.

13. The method of claim 6, wherein the clutch ring and outer housing rotate together, wherein the clutch ring is rotationally moveable relative to the plunger and axially moveable by the plunger.

14. The method of claim 1, wherein the current is applied to the electromagnetic actuator prior to the speed difference reaching the threshold level, such that a time period to engage the first clutch member and the second clutch member following a time of detection of the speed difference reaching the threshold level is reduced relative to the time period to engage the first clutch member and the second clutch member when the current is first applied at the time of detection.

15. The method of claim 1, wherein the disconnected state corresponds to a 2-wheel drive mode of a vehicle and the connected state corresponds to a 4-wheel drive mode of the vehicle.

16. The method of claim 1, wherein a common connect request signal causes the electric motor speed to increase and the initial level of the current to be applied during the same period.

17. A method of controlling a secondary drivetrain, the method comprising the steps of:

receiving a connect request from a control system to connect a disconnect mechanism of the secondary drivetrain, the disconnect mechanism operatively disposed between an electric motor and ground engaging wheels of the secondary drivetrain;

in response to receiving the connect request, increasing electric motor speed to reduce a speed difference between a first clutch member and a second clutch member of the disconnect mechanism when the first and second clutch members are in a disconnected state;

during the increasing of the electric motor speed, applying a current, at an initial level for pre-energization, to an electromagnetic actuator of the disconnect mechanism;

during the increasing of the electric motor speed, detecting a decreasing speed difference between the first clutch member and the second clutch member of the disconnect mechanism;

confirming the speed difference between the first clutch member and second clutch member is below a threshold level;

in response thereto, applying the current, at a second level of the current that is higher than the initial level of the current, to the electromagnetic actuator and, in response thereto, providing movement of a plunger operatively coupled to the second clutch member in a direction toward the first clutch member and engaging the second clutch member with the first clutch member and reaching a connected state;

in response to engaging the first and second clutch members, transferring torque between the electric motor and the ground-engaging wheels via the disconnect mechanism;

wherein a common connect request signal causes the motor speed to increase and the initial level of the current to be applied during the same period;

wherein the time to increase the current to the second level of the current following the connect request signal is unknown at the time of the connect request signal and is dependent on detection of the speed difference reaching the threshold level, wherein the time to reach the threshold level is unknown.

18. An electrically powered drivetrain of a vehicle, wherein the electrically powered drivetrain comprises:

an electric motor drivingly coupled to a differential mechanism having a disconnect mechanism including a first clutch member and a second clutch member moveable from a disconnected state into a connected state with the first clutch member;

wherein, in the connected state, torque is transferred from the electric motor to ground engaging wheels of the drivetrain, and, in the disconnected state, torque output from the electric motor is operationally decoupled from the ground engaging wheels;

wherein, in response to receiving a connect request from a control system of the vehicle, an actuator of the disconnect device applies a current, at an initial level of the current, to a plunger that applies a force on the second clutch member toward the first clutch member, wherein the initial level of the current is below a level that overcomes a bias on the second clutch member, and the second clutch member remains in the disconnected state during application of the initial level of the current;

wherein the first clutch member rotates independent of the second clutch member in the disconnected state;

wherein actuation of the electric motor in response to the connect request reduces a speed difference between the first clutch member and the second clutch member;

wherein the control system detects and confirms that the speed difference is below a threshold level, and the control system increases the current applied to the actuator to a second level of the current that is higher than the initial level of the current, wherein the second level of the current applies a force that overcomes the bias on the second clutch member, and the second clutch member moves to the connected state and torque transfers from the electric motor to the ground engaging wheels via the differential mechanism;

wherein a biasing mechanism is disposed operatively between the plunger and the first clutch member, wherein the biasing mechanism exerts the bias and biases the second clutch member away from the first clutch member toward the disconnected state;

wherein the initial level of the current causes the plunger to exert a force against the biasing member, wherein the biasing force is greater than the force exerted by the plunger against the biasing member, wherein the plunger remains stationary during provision of the initial level of the current.

\*    \*    \*    \*    \*